(12) United States Patent
Roehm

(10) Patent No.: US 9,366,299 B2
(45) Date of Patent: Jun. 14, 2016

(54) HANDHELD DRILL/DRIVER DEVICE

(71) Applicant: Heiko Roehm, Stuttgart (DE)

(72) Inventor: Heiko Roehm, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 165 days.

(21) Appl. No.: 13/927,233

(22) Filed: Jun. 26, 2013

(65) Prior Publication Data
US 2014/0003876 A1 Jan. 2, 2014

(30) Foreign Application Priority Data

Jun. 28, 2012 (DE) .......................... 10 2012 211 177

(51) Int. Cl.
| | |
|---|---|
| *B23Q 17/09* | (2006.01) |
| *F16D 48/06* | (2006.01) |
| *F16D 7/00* | (2006.01) |
| *B25B 23/14* | (2006.01) |
| *B25B 23/147* | (2006.01) |

(52) U.S. Cl.
CPC .............. *F16D 48/06* (2013.01); *B25B 23/141* (2013.01); *B25B 23/147* (2013.01); *F16D 7/00* (2013.01); *B23Q 17/09* (2013.01); *B23Q 17/0952* (2013.01); *B23Q 17/0961* (2013.01); *Y10T 408/13* (2015.01); *Y10T 408/14* (2015.01); *Y10T 408/16* (2015.01); *Y10T 408/165* (2015.01); *Y10T 408/89* (2015.01)

(58) Field of Classification Search
CPC .. B23Q 17/09; B23Q 7/0952; B23Q 17/0961; Y10T 408/13; Y10T 408/14; Y10T 408/16; Y10T 408/165
USPC ................... 408/5, 6, 8, 9; 318/432
See application file for complete search history.

(56) References Cited

U.S. PATENT DOCUMENTS

| | | | | | |
|---|---|---|---|---|---|
| 2,402,273 | A | * | 6/1946 | Bogart ........................... | 279/126 |
| 3,545,310 | A | * | 12/1970 | Greenberg et al. ............. | 408/11 |
| 4,020,405 | A | * | 4/1977 | Schumann et al. ........... | 318/432 |
| 4,559,577 | A | * | 12/1985 | Shoji et al. ...................... | 361/31 |
| 5,895,177 | A | * | 4/1999 | Iwai et al. ...................... | 408/1 R |
| 5,954,457 | A | * | 9/1999 | Stock et al. ...................... | 408/6 |
| 6,424,799 | B1 | * | 7/2002 | Gilmore ........................ | 388/811 |
| 7,677,844 | B2 | * | 3/2010 | Schell et al. ...................... | 408/9 |
| 2006/0237205 | A1 | * | 10/2006 | Sia et al. ......................... | 173/48 |

FOREIGN PATENT DOCUMENTS

DE 10 2009 046 663 7/2010

* cited by examiner

*Primary Examiner* — Daniel Howell
*Assistant Examiner* — Yasir Diab
(74) *Attorney, Agent, or Firm* — Norton Rose Fulbright US LLP

(57) ABSTRACT

A handheld drill/driver device having a mechanical torque coupling that is provided to limit a maximum torque that can be transmitted to an insertion tool. The handheld drill/driver device have at least one monitoring unit that is provided to electrically output a characteristic quantity that is a function at least of a torque transmitted to the insertion tool.

9 Claims, 2 Drawing Sheets

HANDHELD DRILL/DRIVER DEVICE

RELATED APPLICATION INFORMATION

The present application claims priority to and the benefit of German patent application no. 10 2012 211 177.8, which was filed in Germany on Jun. 28, 2012, the disclosure of which is incorporated herein by reference.

FIELD OF THE INVENTION

The present invention relates to a handheld drill/driver device.

BACKGROUND INFORMATION

A handheld drill/driver device has already been proposed having a mechanical torque coupling that is provided in order to limit a maximum torque that can be transmitted to an insertion tool.

SUMMARY OF THE INVENTION

The exemplary embodiments and/or exemplary methods of the present invention are based on a handheld drill/driver device having a mechanical torque coupling that is provided in order to limit a maximum torque that can be transmitted to an insertion tool.

It is proposed that the handheld drill/driver device have at least one monitoring unit that is provided in order to electrically output a characteristic quantity that is a function at least of a torque transmitted to the insertion tool. A "mechanical torque coupling" is to be understood in particular as a coupling that is provided in order to interrupt a rotational connection between an insertion tool mount that fastens the insertion tool and a drive unit of the handheld drill/driver when the torque that can be transmitted has been exceeded. The maximum torque that can be transmitted can be set by an operator. Advantageously, the torque coupling is fashioned at least partly in one piece with a transmission of the handheld drill/driver device. The mechanical torque coupling is fashioned as a torque coupling that appears useful to a person skilled in the art, but which may be according to the embodiment of DE 10 2009 046 663 A1. "Provided" is to be understood in particular as meaning specifically programmed, configured, and/or equipped. An "insertion tool" is to be understood as an arrangement that is provided for the direct processing of a workpiece.

Advantageously, the insertion to is provided so as to be rotationally driven in particular by the insertion tool mount of the handheld drill/driver device during a work process. In particular, the insertion tool is fashioned as an insertion tool that appears useful to a person skilled in the art, but advantageously as a threaded bit, a drive socket, a drill bit, a hole saw, and/or a cutting bit. A "maximum torque that can be transmitted" is to be understood in particular as a highest torque caused by the drive unit that can be applied to the insertion tool in an operating state of the insertion tool mount without opening the torque coupling. "Limit" in this connection is to be understood in particular as meaning that the torque coupling prevents the transmission of a torque larger than the maximum torque of the operating state. A "monitoring unit" is in particular to be understood as a unit that is provided in order to acquire a value that is a function of the torque and to electrically output the characteristic quantity that is a function of the value. The value may be a direct function of the torque. Alternatively or in addition, the value could in particular be an indirect function at least of the torque, such as in particular an angle of rotation of a handheld tool housing of the handheld drill/driver device about an axis of rotation of the insertion tool mount, a position of a change of position, as a function of the torque, of at least one component of a transmission of the handheld drill/driver device, and/or, advantageously, a rotational acceleration of the handheld tool housing about the axis of rotation of the insertion tool mount. In this context, a "characteristic quantity" is to be understood in particular as an electric output quantity of the monitoring unit, this quantity being a function of a torque transmitted to the insertion tool. "Electric" is to be understood in particular as meaning being coded digitally and/or in analog fashion by a current, a charge, and/or a voltage. In particular, "electrically outputted" is also to be understood as meaning that the monitoring unit stores the characteristic quantity in a memory device and/or a register used in particular by a plurality of functions. "Outputted" is to be understood in particular as meaning that the monitoring unit influences a current and/or a voltage in a conductor and/or in a storage unit for the transmission of the characteristic quantity. A "torque transmitted to an insertion tool" is to be understood in particular as a torque that acts on the insertion tool, from the tool mount, during operation at a particular time. "As a function of" is to be understood in particular as meaning that the monitoring unit acquires a value that changes in at least one operating state on the basis of a change of the torque, and determines the characteristic quantity from the value. Through the realization according to the exemplary embodiments and/or exemplary methods of the present invention of the handheld drill/driver device, a change in the torque transmitted to the insertion tool can be reacted to in a constructively simple and flexible manner. In addition, the mechanical torque coupling can achieve a particularly precise setting of the maximum torque.

In a further embodiment, it is proposed that the handheld drill/driver device have a drive unit and a control unit that is provided in order to shut off the drive unit as a function of the characteristic quantity of the monitoring unit; in this way, a particularly safe and/or low-wear use of the handheld drill/driver device can be achieved, in particular given a high maximum torque. A "drive unit" is to be understood in particular as a unit that provides a rotational power for driving the insertion tool during a work process. The drive unit may be provided in order to convert a power differing from a rotational power, in particular electrical energy, into the rotational power. A "control unit" is to be understood in particular as a unit that is provided in order to control and/or to regulate a rotational power provided by the drive unit. Advantageously, the control unit has a computing unit.

A "computing unit" is to be understood in particular as a unit having an information input, and information processing unit, and an information output. Advantageously, the computing unit has at least one processor, a memory device, input and output arrangements, further electric components, an operating program, regulating routines, control routines, and/or calculating routines. The components of the computing unit may be situated on a common circuit board and/or are advantageously situated in a common housing. The control unit and the monitoring unit may be configured so as to be at least substantially separate from one another. Alternatively, the control unit and the monitoring unit could be fashioned at least partially in one piece. The expression "a function of a characteristic quantity of the monitoring unit" is to be understood in particular as meaning that the control unit is provided in order to determine a control quantity of the drive unit at least from the characteristic quantity of the monitoring unit. The rotational power of the drive unit is a function of the control quantity. The term "shut off" is to be understood in particular as meaning that the control unit at least interrupts an outputting of the rotational power of the drive unit. A "rotational power" is to be understood in particular as a power transmitted by a rotation of a component. The control unit may be provided in order to bring about the braking of the insertion tool mount by the drive unit immediately before the shutting off of the drive unit. The drive unit may brake the insertion tool mount at least through a reversal of polarity and/or short-circuiting of the drive unit. Alternatively, or in addition, the control unit can use a brake to brake the insertion tool mount. Alternatively or in addition, the control unit could be provided in order to control the drive unit as a function of the characteristic quantity of the monitoring unit.

In addition, it is proposed that the shutting off of the drive unit as a function of the characteristic quantity of the monitoring unit be made so as to be capable of being deactivated; in this way, in an operating state a maximum torque is advantageously a function of a greatest possible torque of the drive unit. "Made so as to be capable of being deactivated" should be understood in particular as meaning that the control unit is provided so as to, in an operating state, control and/or regulate the drive unit independent of the characteristic quantity of the monitoring unit.

In addition, it is proposed that the control unit is provided in order to shut off the drive unit as a function of the characteristic quantity of the monitoring unit and of an operator characteristic quantity; in this way, an advantageous setting of the maximum torque by an operator can be achieved. An "operator characteristic quantity" is to be understood in particular as a characteristic quantity of an operating arrangement that is a function of an operator input. The control unit may be provided in order to define a maximum torque, a maximum angle of rotation, and/or a maximum angular acceleration as a function of the operator characteristic quantity.

In addition, it is proposed that the torque coupling be made so as to be capable of being deactivated; in this way, in an operating state a maximum torque is advantageously a function of the greatest possible torque of the drive unit. In particular, the torque coupling is deactivated in a drilling mode.

In addition, it is proposed that the monitoring unit is provided in order to determine the characteristic quantity of the torque from at least one characteristic quantity of an energy supply of the drive unit; in this way, a separate sensor for determining the torque can be done without. The control unit and the monitoring unit may be configured at least partly in one piece. Alternatively, the control unit and a torque acquisition arrangement of the handheld drill/driver device could be fashioned at least substantially separately from one another. A "characteristic quantity of an energy supply of the drive unit" is to be understood in particular as a voltage present at the drive unit, a current flowing through the drive unit, and/or a phase caused by the drive unit. The term "determine" is to be understood in particular as meaning that the torque acquisition arrangement calculates the information of the torque at least from at least one characteristic quantity of the energy supply of the drive unit.

In an advantageous embodiment of the present invention, it is proposed that the monitoring unit include an acceleration acquisition arrangement that is provided in order to determine the characteristic quantity of the torque; in this way, risk to the operator can be avoided in a particularly reliable manner. An "acceleration acquisition arrangement" is to be understood in particular as an arrangement that provides an in particular electric characteristic quantity that is a function of an acceleration of at least a part of the handheld drill/driver device.

The acceleration acquisition arrangement may have at least one sensor that appears useful to a person skilled in the art, but advantageously at least one gyroscope, a laser gyroscope, and/or an acceleration sensor.

In addition, it is proposed that the control unit is provided in order to shut off the drive unit when a transmitted torque is reached that is greater than a maximum limiting torque that can be set by the mechanical torque coupling; in this way, an advantageous torque limiting can be achieved in a torque range that is not covered by the mechanical torque coupling. A "maximum limiting torque that can be set" is to be understood in particular as a setting of the torque coupling at which the torque coupling opens when a torque is reached that is associated with the limiting torque. The control unit may be provided in order to shut off the drive unit upon reaching at least a transmitted torque that is between the maximum limiting torque that can be set of the mechanical torque coupling and a maximum torque that can be applied by the drive unit to the torque coupling. The torque at which the control unit shuts off the drive unit can be set by an operator in at least two stages, advantageously more than two stages. For example, the torque coupling could have limiting torques assigned to torques between 0 Nm and 10 Nm. If, in a drilling mode of the torque coupling, the drive unit is capable of reaching a maximum torque of 40 Nm, then the control unit can set at least a limiting torque that is assigned to a transmitted torque between 11 Nm and 40 Nm. A "drilling mode" is to be understood in particular as an operating mode of the torque coupling in which the torque coupling is always closed.

In addition, the exemplary embodiments and/or exemplary methods of the present invention are based on a drilling and/or driving machine having a handheld drill/driver device according to the present invention. In particular, a "drilling and/or driving machine" is to be understood as a machine that is provided in order to drive at least one drill, threaded bit, drive socket, and/or in particular a chisel.

Further advantages result from the following description of the drawings. The drawings show an exemplary embodiment of the present invention. The drawings, the description, and the further descriptions herein contain numerous features in combination. The person skilled in the art will usefully also regard the features individually and combine them to form useful further combinations.

DETAILED DESCRIPTION

Figure 1:
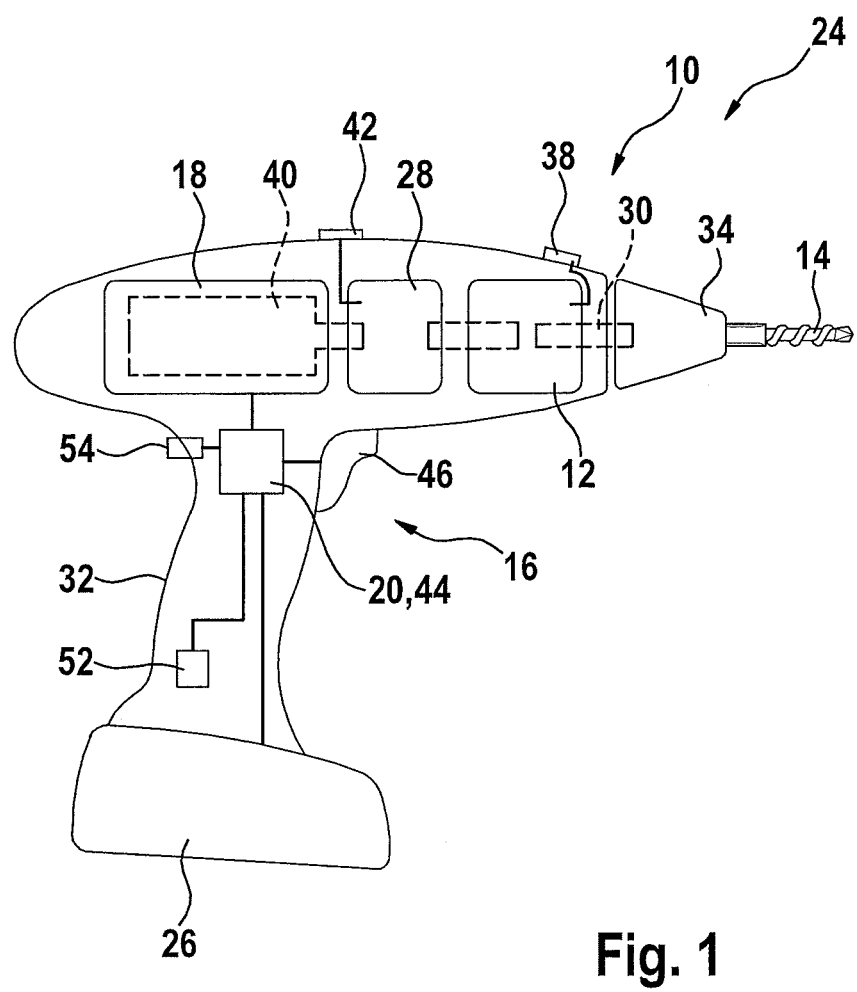
FIG. 1 shows a drilling and/or driving machine having a handheld drill/driver device according to the present invention, in a schematic sectional representation.

FIG. 1 shows an insertion tool 14 and a drilling and/or driving machine 24 according to the present invention. Drilling and/or driving machine 24 has a handheld drill/driver device 10 and a hand tool accumulator 26. In addition, drilling and/or driving machine 24, here not shown in more detail, could have a hammer mechanism. Drilling and/or driving machine 24 is fashioned as a handheld device. Hand tool accumulator 26 supplies handheld drill/driver device 10 with operating energy. Alternatively, drilling and/or driving machine 24 could be provided so as to draw operating energy from a power network. Hand tool accumulator 26 is connected to drilling and/or driving machine 24 so as to be detachable by an operator without using tools.

Handheld drill/driver device 10 includes a torque coupling 12, a monitoring unit 16, a drive unit 18, a control unit 20, a transmission 28, a tool spindle 30, a hand tool housing 32, and an insertion tool mount 34. Insertion tool mount 34 connects tool spindle 30 and insertion tool 14 in torsionally rigid fashion, in a state ready for operation. Tool spindle 30 is mounted in hand tool housing 32 so as to be capable of rotation. Hand tool housing 32 is fashioned in the shape of a pistol. Control unit 20 controls drive unit 18 via a power electronics system 36 (cf. FIG. 2).

Torque coupling 12 creates an operative connection between a part of transmission 28 and tool spindle 30 during a work process. Torque coupling 12 is provided in order to limit a maximum torque that can be transmitted to an insertion tool 14. For this purpose, torque coupling 12 has a locking arrangement (not shown in more detail) that, given a transmitted torque less than the maximum torque, connects the part of transmission 28 and tool spindle 30 in torsionally rigid fashion. When the transmitted torque exceeds the maximum torque, the locking arrangement releases the torsionally rigid connection and permit a rotational offsetting. Subsequently, the locking arrangement produces the torsionally rigid connection again, in a next locked position. This process is also called clutch slipping. Torque coupling 12 has a first operating arrangement 38. Torque coupling 12 is provided in order to modify the maximum torque that can be transmitted to insertion tool 14, as a function of an operator input via first operating arrangement 38. In addition, torque coupling 12 is fashioned so as to be capable of being deactivated by first operating arrangement 38.

Transmission 28 operatively connects a rotor 40 of drive unit 18 to a part of torque coupling 12. Transmission 28 is fashioned, in a manner that appears useful to a person skilled in the art, partly in one piece with torque coupling 12. For example, the locking arrangement of torque coupling 12 could act on a ring gear of transmission 28. Alternatively, a torque coupling and a transmission could be fashioned separately. Here, the torque coupling could be situated between a drive unit and the transmission or between the transmission and a tool spindle. Transmission 28 has a second operating arrangement 42 of handheld drill/driver device 10, by which a gear ratio of transmission 28 can be changed by an operator.

Figure 2:
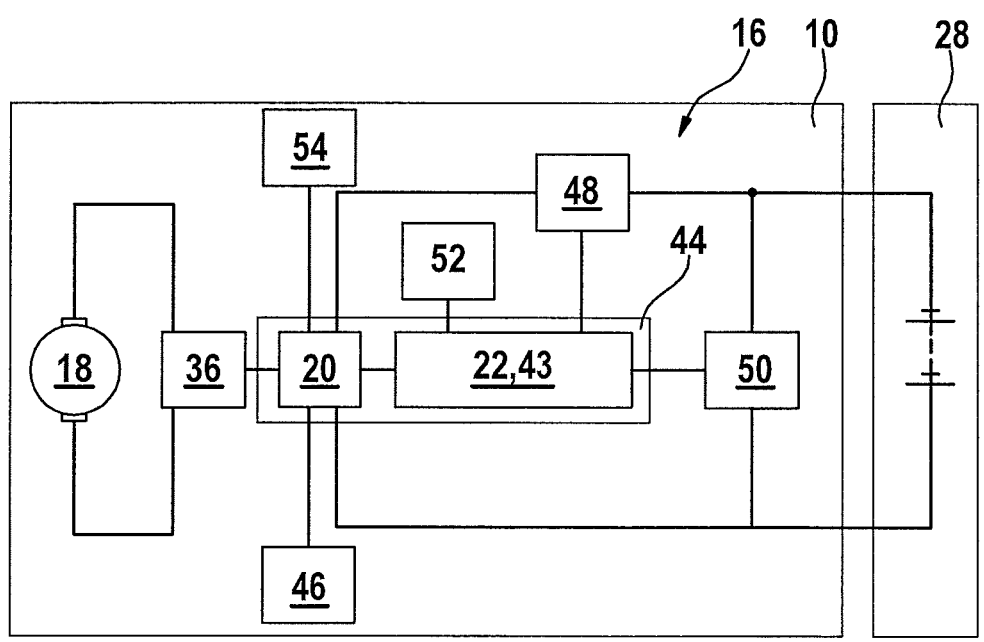
FIG. 2 shows a monitor unit, a drive unit, and a control unit in a schematic functional representation.

Monitoring unit 16 and control unit 20 are fashioned partly in one piece; monitoring unit 16 has a computing routine 43 and control unit 20 has a further computing routine. A common computing unit 44 executes computing routine 43. FIG. 2 shows a function of monitoring unit 16, of drive unit 18, and of control unit 20. During a work process, control unit 20 controls drive unit 18 as a function of an operator input, via a third operating arrangement 46 of handheld drill/driver device 10. Monitoring unit 16 electrically outputs a plurality of characteristic quantities that are a function at least of a torque transmitted to insertion tool 14. Here, monitoring unit 16 is provided in order to determine a first and a second of these characteristic quantities.

Monitoring unit 16 is provided in order to determine a first characteristic quantity of the torque from characteristic quantities of an energy supply of drive unit 18. For this purpose, monitoring unit 16 has a current sensor 48. Current sensor 48 acquires a current flowing through drive unit 18. In addition, monitoring unit 16 has a voltage sensor 50. Voltage sensor 50 acquires a voltage present at drive unit 18. Computing routine 43 of monitoring unit 16 calculates, from the voltage and from the current, a characteristic quantity that is substantially proportional to a momentary torque of drive unit 18 that drive unit 18 brings about in the direction of transmission 28. From this characteristic quantity, monitoring unit 16 determines the first of the characteristic quantities, which is proportional to a torque transmitted at that moment to insertion tool 14. Here, monitoring unit 16 takes into account a friction and a gear ratio of transmission 28.

The second of the characteristic quantities is substantially proportional to an acceleration of hand tool housing 32 about an axis of rotation of insertion tool mount 34. The acceleration of hand tool housing 32 is a function of the torque transmitted to insertion tool 14 as soon as the operator no longer holds drilling and/or driving machine 24, e.g. when there is a blockage of insertion tool 14 in a workpiece. Monitoring unit 16 has an acceleration sensor 52 that measures the acceleration of hand tool housing 32. An acceleration acquisition arrangement 22 of monitoring unit 16 determines, from a characteristic quantity of acceleration sensor 52, the characteristic quantity of the torque. For this purpose, acceleration acquisition arrangement 22 includes a computing routine.

In a first operating mode, control unit 20 shuts off drive unit 18 as a function of the first characteristic quantity. For this purpose, a maximum torque to be outputted by the drive unit 18 can be set using a fourth operating arrangement 54. Control unit 20 compares the first characteristic quantity, which is proportional to the momentary torque, to the maximum torque to be outputted by drive unit 18. If the characteristic quantity exceeds a threshold value that is a function of the maximum torque to be outputted by drive unit 18, control unit 20 shuts off drive unit 18. Here, control unit 20 takes into account a gear ratio of the transmission.

Control unit 20 acquires a setting of torque coupling 12 that describes the maximum torque that can be transmitted to an insertion tool 14 without clutch slipping of torque coupling 12. The maximum torque to be outputted by drive unit 18 can be set between a greatest possible torque that can be applied by drive unit 18 to the torque coupling and the maximum torque that can be transmitted to insertion tool 14 via torque coupling 12. During a determination of the torque that can be applied to the torque coupling by drive unit 18, control unit 20 takes into account a gear ratio of transmission 28.

In a second operating mode, control unit 20 shuts off drive unit 18 as a function of the second characteristic quantity. Control unit 20 has an acceleration threshold value and an angle of rotation threshold value. When the second characteristic quantity exceeds the acceleration threshold value, control unit 20 shuts off drive unit 18. Through integration of the second characteristic quantity over a period of time, control unit 20 determines an angle of rotation characteristic quantity of drilling and/or driving machine 24 in this time period. If the angle of rotation characteristic quantity exceeds the angle of rotation threshold value, control unit 20 shuts off drive unit 18. The second operating mode can be shut off and/or configured by the operator via control unit 20, using an operator characteristic quantity.

What is claimed is:
1. A handheld drill/driver device, comprising:
   a mechanical torque coupling to limit a maximum torque that can be transmitted to an insertion tool, the mechanical torque coupling being configured to modify the limiting torque that can be transmitted to the insertion tool as a function of an operator input via a first operating arrangement;
   at least one monitoring unit to electrically output a torque characteristic quantity that is a function at least of a torque transmitted to the insertion tool;
   a drive unit; and a control unit to shut off the drive unit as a function of the torque characteristic quantity of the monitoring unit, and of an operator characteristic quantity, wherein the operator characteristic quantity is a maximum torque outputted by the drive unit and is defined by an operator input via a second operating arrangement, the maximum torque outputted by the drive unit being greater than the limiting torque set at the mechanical torque coupling, wherein the monitoring unit is configured to determine the torque characteristic quantity from at least one characteristic quantity of an energy supply of the drive unit, wherein the torque characteristic quantity is substantially proportional to a momentary torque of the drive unit, wherein the control unit compares the torque characteristic quantity to the operator characteristic quantity and shuts off the drive unit if the torque characteristic quantity exceeds the operator characteristic quantity.

2. The handheld drill/driver device of claim 1, wherein the shutting off of the drive unit as a function of the characteristic quantity of the monitoring unit is made so as to be deactivatable.

3. The handheld drill/driver device of claim 1, wherein the torque coupling is configured so as to be deactivatable.

4. A drilling and/or driving machine, comprising:
a handheld drill/driver device, including:
a mechanical torque coupling to limit a maximum torque that can be transmitted to an insertion tool;
at least one monitoring unit to electrically output a torque characteristic quantity that is a function at least of a torque transmitted to the insertion tool;
a drive unit; and
a control unit to shut off the drive unit as a function of the torque characteristic quantity of the monitoring unit, and of an operator characteristic quantity,
wherein the operator characteristic quantity is a maximum torque outputted by the drive unit and is defined by an operator input via a second operating arrangement, the maximum torque outputted by the drive unit being greater than the limiting torque set at the mechanical torque coupling,
wherein the monitoring unit is configured to determine the torque characteristic quantity from at least one characteristic quantity of an energy supply of the drive unit,
wherein the torque characteristic quantity is substantially proportional to a momentary torque of the drive unit,
wherein the control unit compares the torque characteristic quantity to the operator characteristic quantity and shuts off the drive unit when the torque characteristic quantity exceeds the operator characteristic quantity.

5. The drilling and/or driving machine of claim 4, wherein the shutting off of the drive unit as a function of the torque characteristic quantity of the monitoring unit is made so as to be deactivatable.

6. The drilling and/or driving machine of claim 4, wherein the torque coupling is configured so as to be deactivatable.

7. The drilling and/or driving machine of claim 4, wherein the monitoring unit is configured to determine the torque characteristic quantity of the torque from at least one characteristic quantity of an energy supply of the drive unit.

8. The drilling and/or driving machine of claim 4, wherein the control unit is configured to shut off the drive unit when a transmitted torque is reached that is greater than a maximum limiting torque that can be set using the mechanical torque coupling.

9. The drilling and/or driving machine of claim 4, wherein the mechanical torque coupling is configured to modify the limiting torque that can be transmitted to the insertion tool as a function of an operator input via a first operating arrangement.

* * * * *